United States Patent
Khatib et al.

(10) Patent No.: US 10,146,293 B2
(45) Date of Patent: Dec. 4, 2018

(54) PERFORMANCE-AWARE POWER CAPPING CONTROL OF DATA STORAGE DEVICES

(71) Applicant: HGST Netherlands B.V., Amsterdam (NL)

(72) Inventors: Mohammed Ghiath Khatib, San Jose, CA (US); Damien Cyril Daniel Le Moal, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 153 days.

(21) Appl. No.: 14/493,304

(22) Filed: Sep. 22, 2014

(65) Prior Publication Data
US 2016/0085289 A1    Mar. 24, 2016

(51) Int. Cl.
*G06F 1/32* (2006.01)
*G06F 3/06* (2006.01)

(52) U.S. Cl.
CPC .......... *G06F 1/3268* (2013.01); *G06F 1/3221* (2013.01); *G06F 3/0625* (2013.01); *G06F 3/0659* (2013.01); *Y02D 10/154* (2018.01)

(58) Field of Classification Search
CPC ..... G06F 1/3268; G06F 3/0625; G06F 3/0659
See application file for complete search history.

(56) References Cited

U.S. PATENT DOCUMENTS

| | | | |
|---|---|---|---|
| 5,493,670 A | 2/1996 | Douglis et al. | |
| 5,574,920 A | 11/1996 | Parry et al. | |
| 5,898,880 A | 4/1999 | Ryu | |
| 5,937,433 A | 8/1999 | Lee et al. | |
| 6,553,501 B1 | 4/2003 | Yokoe | |
| 6,809,896 B2 | 10/2004 | Espeseth et al. | |
| 7,010,653 B2 | 3/2006 | Uchida et al. | |
| 7,240,225 B2 | 7/2007 | Brewer et al. | |
| 7,475,265 B2 | 1/2009 | Oshikawa et al. | |
| 7,543,108 B2 | 6/2009 | Kakihara et al. | |

(Continued)

FOREIGN PATENT DOCUMENTS

| | | |
|---|---|---|
| EP | 1605456 | 3/2008 |
| JP | 2003308176 | 10/2003 |

(Continued)

OTHER PUBLICATIONS

Molaro, D., et al., Tempo: Disk drive power consumption characterization and modeling, Consumer Electronics, 2009. ISCE '09. IEEE 13th International Symposium, May 2009, abstract only. Available at: http://ieeexplore.ieee.org/xpl/login.jsp?tp=&arnumber=5156863&isnumber=5156791&url=http%3A%2F%2Fieeexplore.ieee.org%2Fstamp%2Fstamp.jsp%3Ftp%3D%26arnumber%3D5156863%26isnumber%3D5156791.

(Continued)

*Primary Examiner* — Jaweed A Abbaszadeh
*Assistant Examiner* — Cheri Harrington

(57) ABSTRACT

Systems, methods, and firmware for power control of data storage devices are provided herein. In one example, a data storage device is presented. The data storage device includes a storage control system to identify a power threshold for the data storage device. The data storage device determines power consumption characteristics for the data storage device and enters into a power controlled mode for the data storage device that adjusts at least a storage transaction queue depth in the data storage device to establish the power consumption characteristics as below the power threshold for the data storage device.

19 Claims, 9 Drawing Sheets

(56) References Cited

U.S. PATENT DOCUMENTS

| | | | |
|---|---|---|---|
| 7,702,931 B2 | 4/2010 | Goodrum et al. | |
| 7,721,011 B1 | 5/2010 | Sutera | |
| 7,872,825 B2 | 1/2011 | Sanghvi | |
| 7,890,780 B2 | 2/2011 | Golasky et al. | |
| 8,072,704 B1 | 12/2011 | Goldberg et al. | |
| 8,239,589 B1* | 8/2012 | Certain | G06F 13/1626 710/39 |
| 8,325,555 B2 | 12/2012 | Jeong et al. | |
| 8,364,992 B2* | 1/2013 | Guthrie | G06F 3/0625 711/111 |
| 8,400,893 B2 | 3/2013 | Takada et al. | |
| 8,468,375 B2 | 6/2013 | Mori et al. | |
| 8,627,124 B2 | 1/2014 | Carter et al. | |
| 9,195,293 B1* | 11/2015 | Quillen | G06F 1/3206 |
| 2002/0002655 A1* | 1/2002 | Hoskins | G06F 3/0626 711/112 |
| 2003/0149837 A1* | 8/2003 | Coker | G06F 3/0601 711/113 |
| 2003/0174433 A1* | 9/2003 | Espeseth | G11B 21/083 360/78.07 |
| 2003/0225969 A1 | 12/2003 | Uchida et al. | |
| 2005/0210304 A1 | 9/2005 | Hartung et al. | |
| 2006/0106980 A1* | 5/2006 | Kobayashi | G06F 3/0611 711/113 |
| 2006/0159013 A1 | 7/2006 | Lee | |
| 2007/0204124 A1 | 8/2007 | Van Gassel et al. | |
| 2007/0226462 A1* | 9/2007 | Scott | G06F 9/30149 712/207 |
| 2009/0254525 A1 | 10/2009 | Srinivasan | |
| 2010/0017542 A1 | 1/2010 | Merry, Jr. et al. | |
| 2010/0332861 A1 | 12/2010 | Allalouf et al. | |
| 2011/0060921 A1 | 3/2011 | Michael | |
| 2011/0060927 A1* | 3/2011 | Fillingim | G11C 5/141 713/320 |
| 2011/0239013 A1* | 9/2011 | Muller | G06F 1/3221 713/320 |
| 2012/0066439 A1 | 3/2012 | Fillingim | |
| 2012/0078858 A1* | 3/2012 | Nagpal | G06F 17/30303 707/692 |
| 2012/0331207 A1 | 12/2012 | Lassa | |
| 2013/0142035 A1* | 6/2013 | Sunderrajan | H04L 47/728 370/225 |
| 2013/0223254 A1* | 8/2013 | Oguchi | H04L 47/283 370/252 |
| 2013/0339599 A1* | 12/2013 | Sundrani | G06F 3/061 711/114 |
| 2014/0071558 A1 | 3/2014 | Lu et al. | |
| 2014/0075144 A1 | 3/2014 | Sanders et al. | |
| 2014/0173306 A1 | 6/2014 | Cooper | |
| 2014/0181561 A1 | 6/2014 | Shippy | |
| 2014/0325095 A1 | 10/2014 | Kang et al. | |
| 2014/0379940 A1* | 12/2014 | Fulkerson | G06F 3/0659 710/5 |
| 2015/0101024 A1 | 4/2015 | Leggette | |
| 2015/0106644 A1 | 4/2015 | Lin et al. | |
| 2015/0127967 A1 | 5/2015 | Dutton et al. | |
| 2015/0135255 A1* | 5/2015 | Theimer | H04L 63/20 726/1 |
| 2015/0156204 A1* | 6/2015 | Resch | H04L 63/101 707/783 |
| 2015/0201017 A1* | 7/2015 | Hrischuk | H04L 67/1097 709/226 |
| 2015/0261473 A1 | 9/2015 | Matsuyama | |
| 2016/0085288 A1 | 3/2016 | Khatib | |
| 2016/0085289 A1 | 3/2016 | Khatib | |

FOREIGN PATENT DOCUMENTS

| | | |
|---|---|---|
| JP | 2008003719 | 1/2008 |
| JP | 2010003099 | 1/2010 |
| JP | 2011-210024 A | 10/2011 |
| JP | 2012523593 | 10/2012 |

OTHER PUBLICATIONS

Hard Disk Sentinel, Retrieved at http://www.hdsentinel.com/ on May 13, 2014, 2 pages.

Hitachi Global Storage Technologies, "Hitachi Feature Tool Usage Instructions", Oct. 19, 2005, 26 pages.

WD Diagnostics, "Software Informer", retrieved at http://wd-diagnostics.software.informer.com/ on May 13, 2014, 2 pages.

IEEE Xplore Digital Library, "Leveraging Disk Driver Acoustic Modes for Power Management", 2010 IRRR 26th Symposium, May 2-7, 2010, 1 page.

EFD Software, "Drive Power Manager", Retrieved at http://www.drivepowermanager.com/ on May 9, 2014, 1 page.

* cited by examiner

PERFORMANCE-AWARE POWER CAPPING CONTROL OF DATA STORAGE DEVICES

TECHNICAL BACKGROUND

Computer and network systems such as personal computers, workstations, server systems, and cloud storage systems, typically include data storage systems for storing and retrieving data. These data storage systems can include data storage devices, such as hard disk drives, solid state storage devices, tape storage devices, and other mass storage devices.

The recent demand for digital contents and big data are fueling the need for more, denser, and larger data centers. Power dissipation of data centers is a matter of concern. Data centers are frequently constrained by the allowed peak power at their disposal. Peak power capacity is important, because both the power conditioning and distribution infrastructure and the cooling systems must be sized based on their combined peak power requirements.

Data center operators oversubscribe data centers power supply with more machine servers and users than the maximum allowable at any time to maximize their utilization. Power capping has been employed in data centers to set maximum power usages for the various computing systems contained in the data centers. However, power dissipation by individual components of the computing systems is limited to very coarse adjustments, such as sleep modes or powering down of unused computing elements.

OVERVIEW

Systems, methods, and firmware for power control of data storage devices are provided herein. In one example, a data storage device is provided. The data storage device includes a storage control system to identify a power threshold for the data storage device. The data storage device determines power consumption characteristics for the data storage device and enters into a power controlled mode for the data storage device that adjusts at least a storage transaction queue depth in the data storage device to establish the power consumption characteristics as below the power threshold for the data storage device.

DETAILED DESCRIPTION

Data storage systems employ various mass-storage devices, such as hard disk drives, solid state drives, among other storage devices. However, these storage devices can use high levels of power which can lead to excessive power consumption by data centers which aggregate many data storage systems together. In the examples discussed below, various methods, systems, apparatuses, and firmware allow for fine-grained control of power consumption in the various mass storage devices used in data servers and data storage systems. For example, a hard disk drive can be placed into a power capped mode which modifies parameters of the hard disk drive to allow storage operations to fall below a power threshold for that hard disk drive. Other examples of power capping and power control of data storage devices are discussed below.

Figure 1:
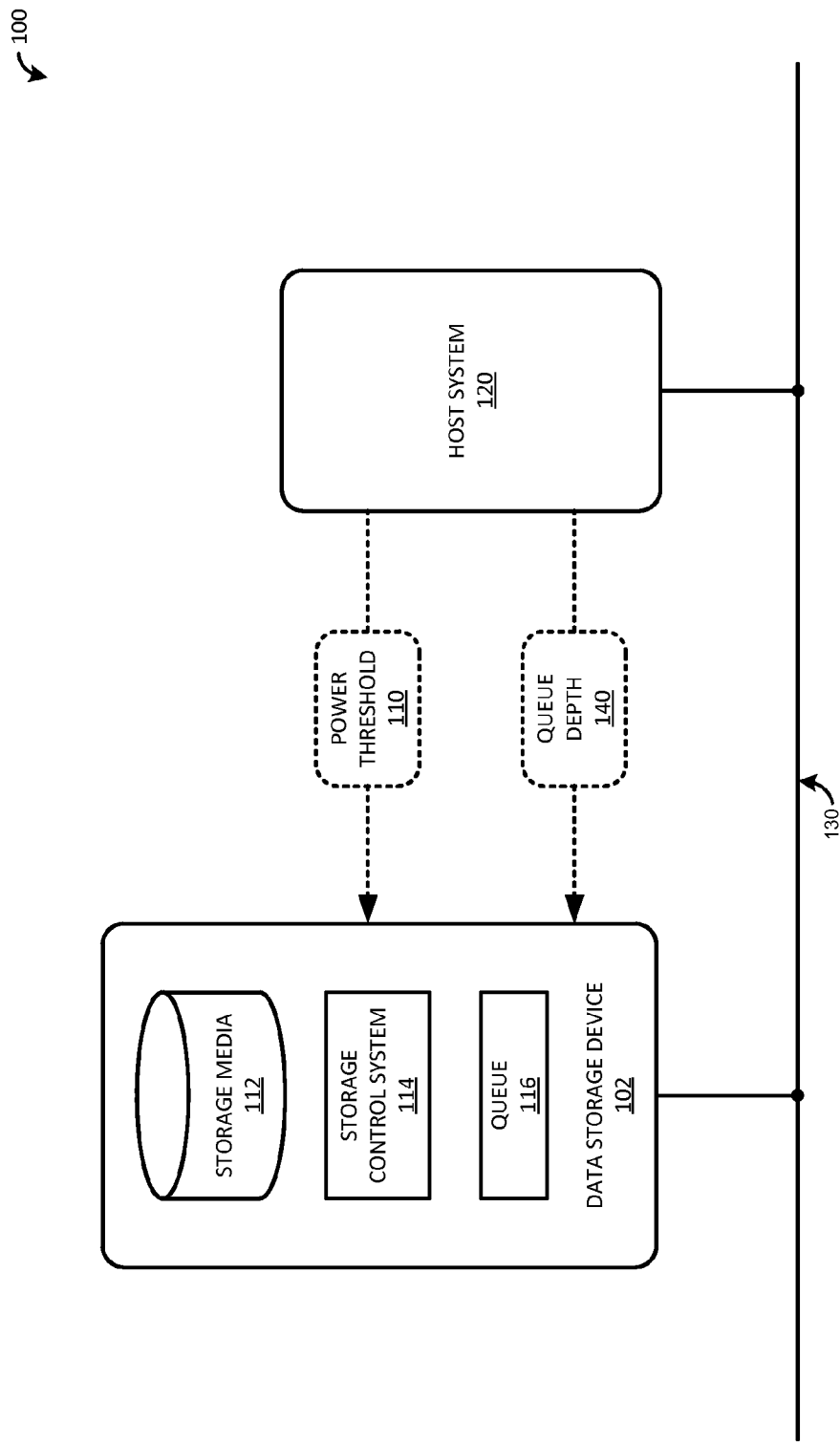
FIG. 1 illustrates a storage system for performance-aware power capping in data storage devices.

As a first example, FIG. 1 is presented. FIG. 1 illustrates storage system 100 for performance-aware power capping in data storage devices. Storage system 100 comprises data storage device 102 and host system 120. Data storage device 102 and host system 120 communicate over link 130. Data storage device 102 comprises storage media 112, storage control system 114, and queue 116. Storage media 112 includes any physical media which can be used to store the desired information and that can be accessed by an instruction execution system such as storage control system 114. Storage control system 114 includes processing circuitry and memory for accessing storage media 112. Queue 116 comprises a data structure of commands for data storage device 102, such as read or write commands. Host system 120 includes one or more computing and network systems, such as personal computers, servers, or other computer and network systems. In operation, host system 120 transfers power threshold 110 and/or queue depth 140 to data storage device 102. Data storage device 102 receives power threshold 110 and/or queue depth 140 from host system 120.

Figure 2:
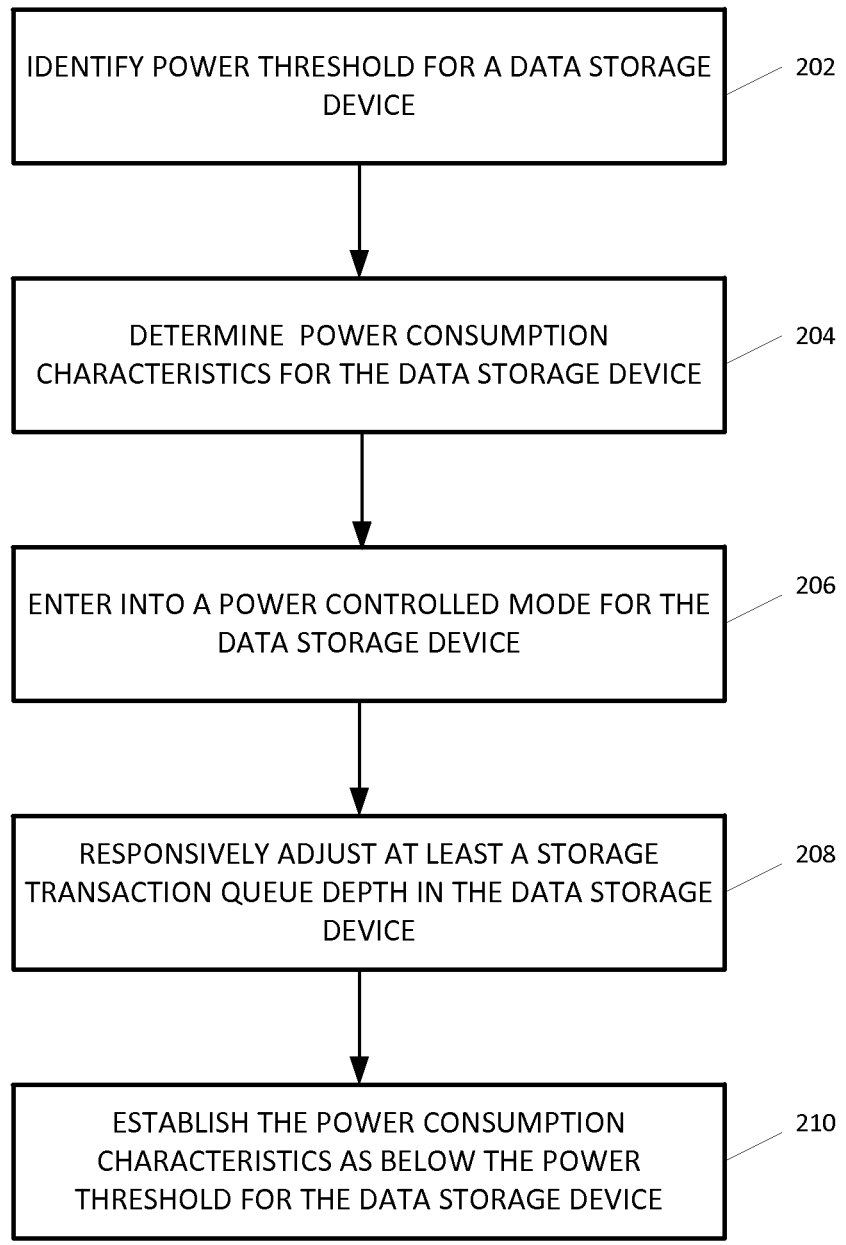
FIG. 2 illustrates a method of operating a storage system for performance-aware power capping in a data storage device.

FIG. 2 illustrates a method of operating storage system 100 for performance-aware power capping in a data storage device. The operations can be performed either by data storage device 102 or by host system 120 independently or by data storage device 102 and host system 120 simultaneously. The operations of FIG. 2 are referenced below parenthetically.

In a first example of FIG. 2, data storage device 102 performs the operations of FIG. 2, although it should be understood that operations in FIG. 2 can be performed by host system 120, as mentioned above. Data storage device 102 identifies power threshold 110 for data storage device 102 (202). Power threshold 110 indicates allowable maximum or minimum power consumption characteristics for data storage device 102. Power threshold 110 specifies power consumption threshold values in Watts or other units of power or energy dissipation, which can be based on a current draw and supply voltage of data storage device 102. Data storage device 102 determines power consumption characteristics for data storage device 102 (204). Power consumption characteristics can be defined in various ways. For example, power consumption characteristics may indicate maximum allowable power dissipation per a unit of time or per a transaction for data storage device 102. Data storage device 102 enters into a power controlled mode for data storage device 102 (206).

A power controlled mode is an operating mode for data storage device 102 that provides a fine degree of control over the power consumption characteristics of data storage device 102 by controlling queue depth 140. Two possible power controlled modes include latency mode and throughput mode obtained by tuning queue 116. Latency mode offers fast response time by decreasing queue depth 140. Throughput mode offers efficient performance for data streams by increasing queue depth 140. Data storage device 102 responsively adjusts at least queue depth 140 in data storage device 102 (208). Queue depth 140 can be controlled by storage control system 114 or host system 120. Latency mode and throughput mode can be achieved by controlling queue depth 140. Data storage device 102 establishes power consumption characteristics as below power threshold for data storage device 102 (210). Data storage device 102 monitors power consumption characteristics of data storage device 102 and responsively adjusts power controlled modes and queue depth 140 to establish and maintain desirable power consumption characteristics. Power consumption characteristics monitoring may be either continuous or discrete.

Figure 3:
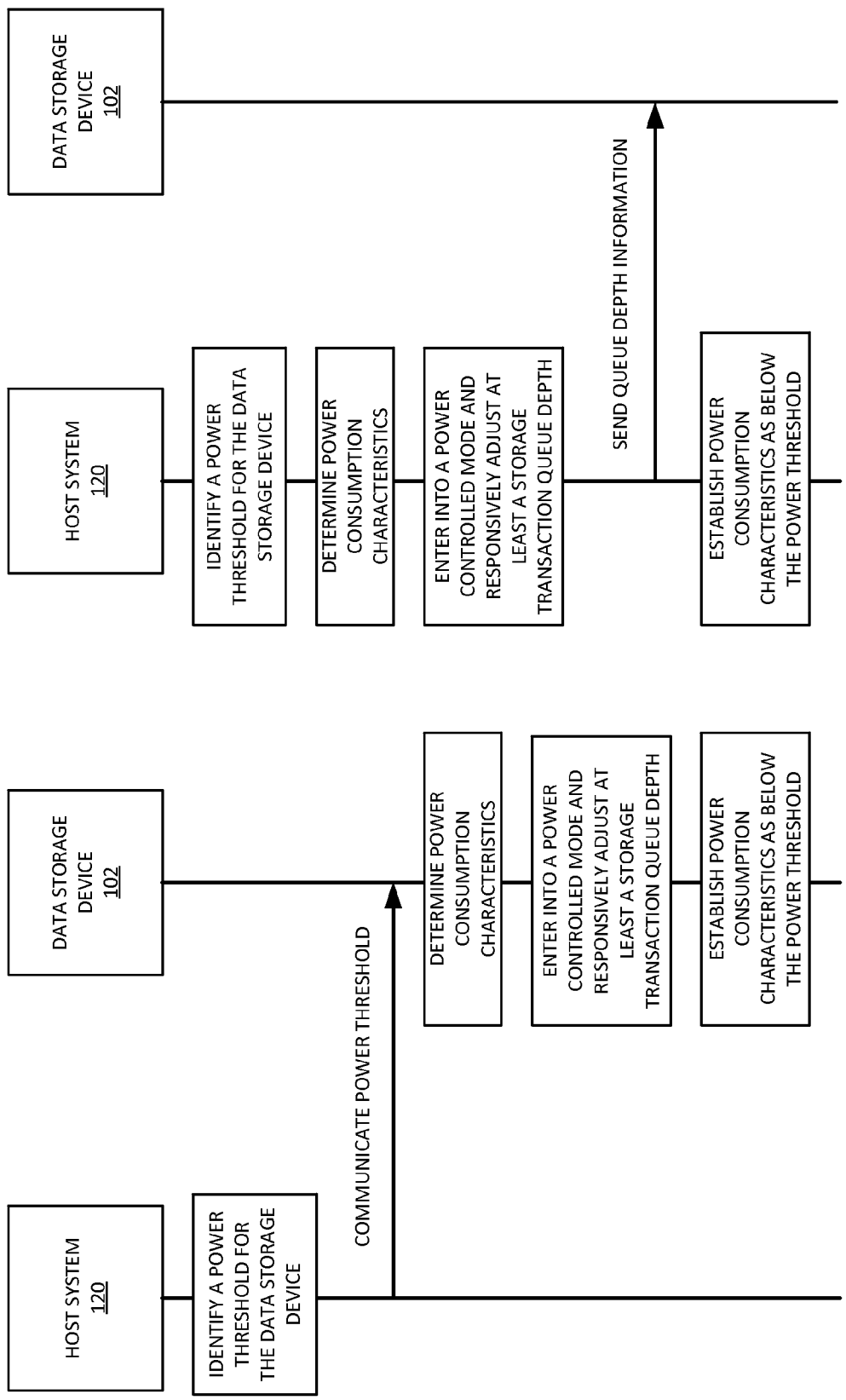
FIG. 3A illustrates a method of operating a storage system for performance-aware power capping in a data storage device.
FIG. 3B illustrates a method of operating a storage system for performance-aware power capping in a data storage device.

As further examples of controlling power consumption in data storage drives, FIGS. 3A and 3B are presented. FIGS. 3A and 3B further illustrate methods of operating storage system 100 for performance-aware power capping in data storage devices. FIG. 3A illustrates a method of operating storage system 100 performed by data storage device 102 for performance-aware power capping in data storage devices. FIG. 3B illustrates a method of operating storage system 100 performed by host system 120 for performance-aware power capping in data storage devices.

FIG. 3A illustrates a method of operating storage system 100 performed by data storage device 102 for performance-aware power capping in data storage devices. Host system 120 identifies power threshold 110 for data storage device 102. Host system 120 communicates power threshold 110 to data storage device 102 (302). Data storage device 102 determines power consumption characteristics. Data storage device 102 enters into a power controlled mode and responsively adjusts at least queue depth 140. Data storage device 102 establishes power consumption characteristics as below power threshold.

FIG. 3B illustrates a method of operating storage system 100 performed by host system 120 for performance-aware power capping in data storage devices. Host system 120 identifies power threshold 110 for data storage device 102. Host system 120 determines power consumption characteristics for data storage device 102. Host system 120 enters into a power-controlled mode and responsively adjusts at least queue depth 140. Host system 120 sends queue depth information to data storage device 102 and establishes power consumption characteristics for data storage device 102 as below power threshold 110 (304).

Referring back to FIG. 1, the elements of storage system 100 are further described below. Data storage device 102 can be a hard disk drive (HDD), solid state storage drive (SSD), flash memory drive, phase change memory drive, optical memory drive, or some other type of data storage device, including combinations and variations thereof. Data storage device 102 includes electrical components, such as host interfaces, processing circuitry, data buffers, memory, and read/write heads.

Storage media 112 includes any physical media which can be used to store the desired information and that can be accessed by an instruction execution system such as storage control system 114. Examples of storage media 112 include random access memory, read only memory, magnetic disks, optical disks, flash memory, phase change memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Storage control system 114 includes processing circuitry and memory for accessing storage media 112. Storage control system 114 which further includes processing circuitry, memory, host interface, and buffer. Memory also includes firmware which is executed by at least storage control system 114 to operate and respond to read and write commands received over link 130.

Host system 120 can include one or more computing and network systems, such as personal computers, server computers, rack servers, web servers, cloud computing platforms, packet networks, management systems, and data center equipment, as well an any other type of physical or virtual server machine, and any variation or combination thereof In operation, host system 120 issues read and write commands to data storage device 102 over link 330. In further examples, host system 120 can issue one or more commands for data storage device 102 to enter into a power controlled mode.

Link 130 can include one or more links. Link 130 comprises metallic, wireless, optical, or some other network link including combinations thereof Link 130 can comprise any storage or disk interface, such as Serial Attached ATA (SATA), Serial Attached SCSI (SAS), FiberChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof Link 130 utilizes various communication and control protocols, such as LTE, GSM, CDMA, Internet Protocol (IP), Ethernet, Session Initiation Protocol (SIP), Diameter, Real-time Transfer Protocol (RTP), and/or some other format—including combinations thereof.

Figure 4:
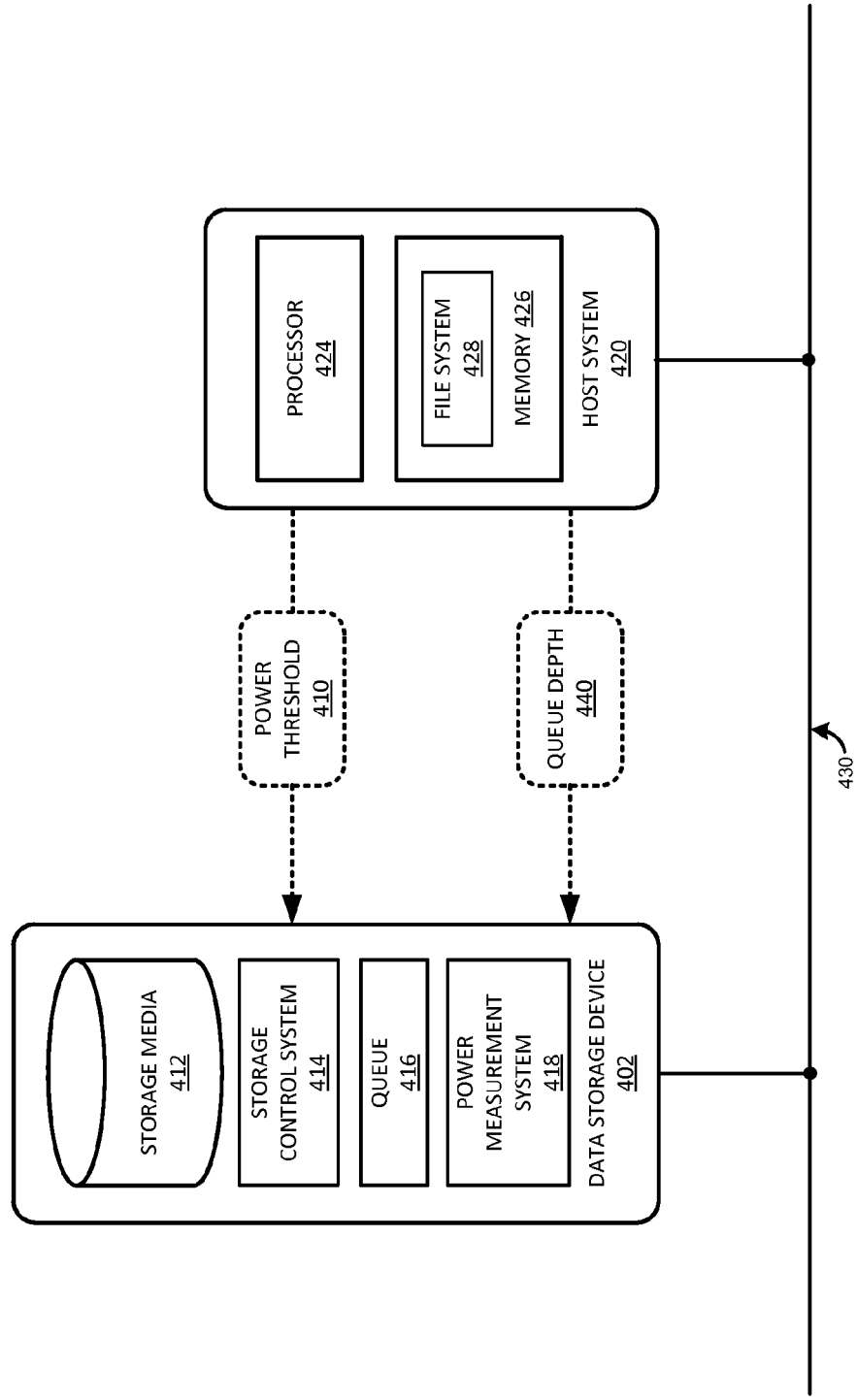
FIG. 4 illustrates an alternative embodiment of a storage system for performance-aware power capping in a data storage device.

FIG. 4 illustrates storage system 400 for performance-aware power capping in data storage devices. Storage system 400 is an example of storage system 100, although storage system 100 may have alternative configurations and operations. Storage system 400 comprises data storage device 402 and host system 420. Data storage device 402 and host system 420 communicate via link 430.

Data storage device 402 comprises storage media 412, storage control system 414, queue 416, and power measurement system 418. Data storage device 402 may be a hard disk drive, a removable disk storage drive, a solid state drive, a tape drive, or some other storage device having power consumption characteristics affected by queue depth 440.

Storage control system 414 includes processing circuitry and memory. Processing circuitry can comprise one or more microprocessors and other circuitry that retrieves and executes firmware from memory. Processing circuitry can be implemented within a single processing device but can also be distributed across multiple processing devices or subsystems that cooperate in executing program instructions. Examples of processing circuitry include general purpose central processing units, application specific processors, and logic devices, as well as any other type of processing device, combinations, or variations thereof Storage control system 414 may increase queue depth 440 to increase throughput above a throughput threshold while power consumption characteristics are maintained below power threshold 410. Alternatively, storage control system 414 may decrease queue depth 440 to reduce latency to below a latency threshold while the power consumption characteristics are maintained below the power threshold. Storage control system 414 may configure a sampling rate, establish a measurement period, and select among a time-based power measurement and a transaction-based power measurement. Host system 420 is capable of performing the same operations as storage control system 414.

Storage media 412 includes random access memory, read only memory, magnetic disks, optical disks, flash memory, phase change memory, magnetic tape, or other storage media, including combinations and variations thereof In many examples, data storage device 402 includes various mechanical, electrical, and electromechanical components for reading and writing to storage media 412, such as read/write heads, armatures, optical read/write elements, servos, preamps, amplifiers, or other components, including combinations thereof.

Power measurement system 418 measures at least power usage by data storage device 402. Power measurement system may take power measurements instantaneously, over a specified time period, or per data storage device 402 transaction. The operation of power measurement system 418 of data storage device 402 may be controlled by host system 420. Power measurement system may continuously and periodically communicate with host system 420 for power measurement system 418 settings.

Host system 420 comprises processor 424 and memory 426. Host system 420 can include one or more computing and network systems, such as personal computers, servers, cloud storage systems, packet networks, management systems, or other computer and network systems, including combinations and variations thereof In operation, host system 420 issues read and write commands to data storage device 402 over link 430. In some examples, host system 420 issues commands to data storage device 402. For example, host system 420 can enable or disable power measurement system 418, and issue measurement commands to power measurement system 418. Host system 420 can also command data storage device to enter into a power controlled mode. Host system 420 is also capable of adjusting queue depth 440 to establish desirable power consumption characteristics for data storage device 402. Host system 420 transfers power threshold 410 and/or queue depth 440 to data storage device 402. Host system configures sampling rate, establishes a measurement period, and selects between a time-based power measurement and a transaction-based power measurement.

Processor 424 comprises one or more microprocessors and other circuitry that retrieves and executes firmware from memory. Processing circuitry can be implemented within a single processing device but can also be distributed across multiple processing devices or sub-systems that cooperate in executing program instructions. Examples of processing circuitry include general purpose central processing units, application specific processors, and logic devices, as well as any other type of processing device, combinations, or variations thereof.

Memory 426 comprises file system 428. Examples of memory 426 include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

File system 428 can be a disk file system, optical disk file system, flash file system, tape file system, a transactional file system, networked file system, shared disk file system, device file systems and other files systems. Disk file system may include FAT (FAT12, FAT16, FAT32), exFAT, NTFS, HFS, HFS+, HPFS, UFS, ext2, ext4, XFS, btrfs, ISO 9660, Files-11, Verita File System, VMFS, ZFS, ReiserFS, UDF or some other file system. Optical disk file system may include ISO 9660, Universal Disk Format (UDF), Mount Rainier or some other optical disk file system. Tape file system may include IBM Linear Tape File System—Single Drive Edition (LTFS-SDE) or some other tape file system. Transactional file system may include Transactional NTFS, Valor, Amino, LFS, Transactional ext3, or some other transactional file system. Some examples of networked file systems may include clients for NFS, AFS, SMD protocols, and filesystem-like client for FTP and WEBDAV. Some examples of shared disk file systems include GFS2, GPFS, SFS, CXFS, StorNext or some other shared disk file system.

Power threshold 410 indicates allowable maximum or minimum power consumption characteristics for data storage device 402. Power threshold 410 specifies power consumption threshold values in Watts or other units of power or energy dissipation. Power threshold 410 may limit power consumption on a time or transaction basis. For example, power threshold 410 may specify that data storage device 402 may only use a peak amount of power during a particular period of time. Alternatively, power threshold 410 may specify that data storage device 402 limit power consumption to a specified amount of power per transaction. Power threshold 410 may be continuously variable or constant.

Queue depth 440 may be tuned to establish desirable power consumption characteristics of data storage device 402. Data storage device 402 is configured to enter into a power controlled mode and responsively adjust at least queue depth 440 to establish power consumption characteristics as below power threshold 410. Power controlled modes include a throughput mode and a latency mode. Throughput power controlled mode increases the queue depth 440 to allow high throughput above a throughput threshold while the power consumption characteristics are maintained below the power threshold. Latency power controlled mode decreases the queue depth 440 to reduce latency to below a latency threshold while the power consumption characteristics are maintained below the power consumption threshold.

Link 430 can include one or more links, although a single link is shown in FIG. 4. Link can comprise any storage or disk interface, such as Serial Attached ATA (SATA), Serial Attached SCSI (SAS), FiberChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof.

Figure 5:
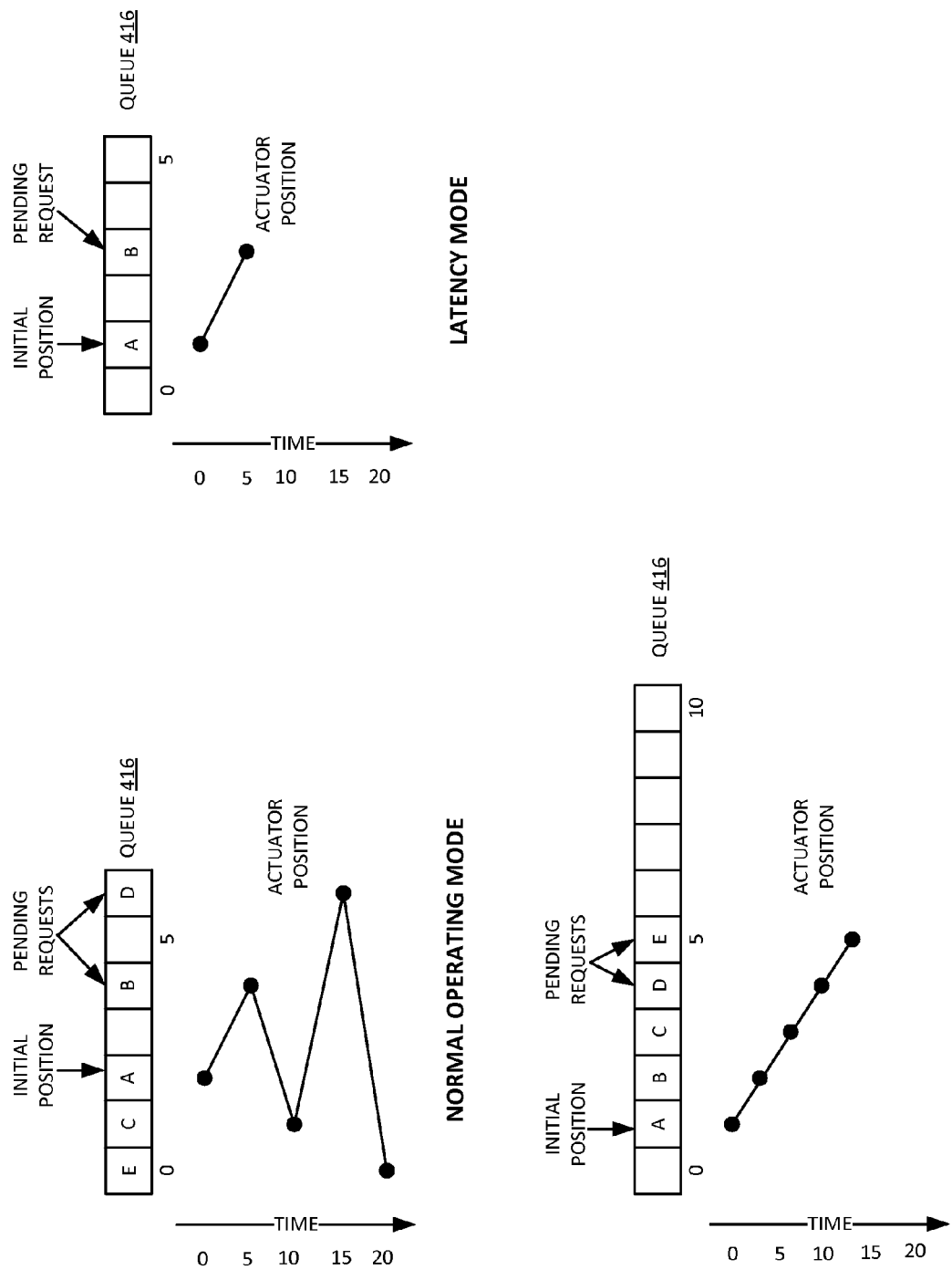
FIG. 5 illustrates a method of operating a storage system for performance-aware power capping in a data storage device.

FIG. 5 illustrates exemplary power controlled modes for performance-aware power capping in a data storage device. Data storage device 402 has different power consumption characteristics based upon the operating mode. Manipulation of queue 416 can create different operating modes including power controlled modes. Some examples of power controlled modes include a throughput mode and a latency mode. For example, increasing queue depth 440 will improve data storage device 402 throughput performance at the expense of latency performance. Alternatively, decreasing queue depth 440 will improve data storage device 402 latency at the expense of throughput performance. These power controlled modes can be used to tune power consumption characteristics of data storage device 402 such that data storage device 402 does not consume more power than power threshold 410.

FIG. 5 includes an illustration of the normal operating mode of data storage device 402 working with queue 416. For this example, data storage device 102 is hard disk drive. Though not shown, hard disk drives typically include a servo for moving an armature that holds the read/write heads. The servo/armature mechanism consumes power when positioning the read/write heads across storage media 412 surface to different angular positions.

In normal operating mode, the read/write head start at an initial position "A" and must travel in a first direction to get to second position "B" and then move in an opposite direction to get to the third position "C". Note that the read/write head position is not efficiently controlled with respect to time and uses more power than it needs. Queue 416 does not have sufficient depth to be manipulated by storage control system 112 or host system 120 for more efficient read/write head positioning. Power consumption characteristics are therefore related to queue depth 440.

FIG. 5 includes an illustration describing throughput mode for data storage device 402 for performance-aware power capping in data storage devices. Throughput mode is achieved by increasing queue depth 440. When queue depth 440 is deep enough the pending requests can be organized for more efficient read-write times as shown in the throughput mode of FIG. 5. Increasing queue depth 440 allows pending requests to be organized within queue 416 for more efficient read/write head positioning. Note that the same requests are handled more quickly in throughput mode than in normal operating mode. If queue 416 depth were shallow, as in normal operating mode, then storage control system 414 or host system 120 would not have the resources to arrange the pending requests in an efficient order for throughput mode. Queue 416 would be forced to operate in a mode similar to normal operating mode.

FIG. 5 illustrates a latency mode for data storage device 402 for performance-aware power capping in data storage devices. Latency can comprise the time in which a transaction is stored within queue 416 until it is read from or written to storage media 112 by a read/write head. Read latency is comprised of the time a read command is issued by host 420 and the time it takes for the data to be returned to the host system responsive to the read. Write latency is similar except the endpoint is the commitment of the data by the write head to storage media 112 and a signal that indicates completion of the write. A large queue depth 440 will increase latency because a read/write command will have to wait for pending requests in queue 416 to be completed. If data storage device 102 or host system 120 where to establish a small queue depth 440, then latency is reduced because storage control system 414 or host system 420 do not have to wait for a large number pending requests to complete.

Figure 6:
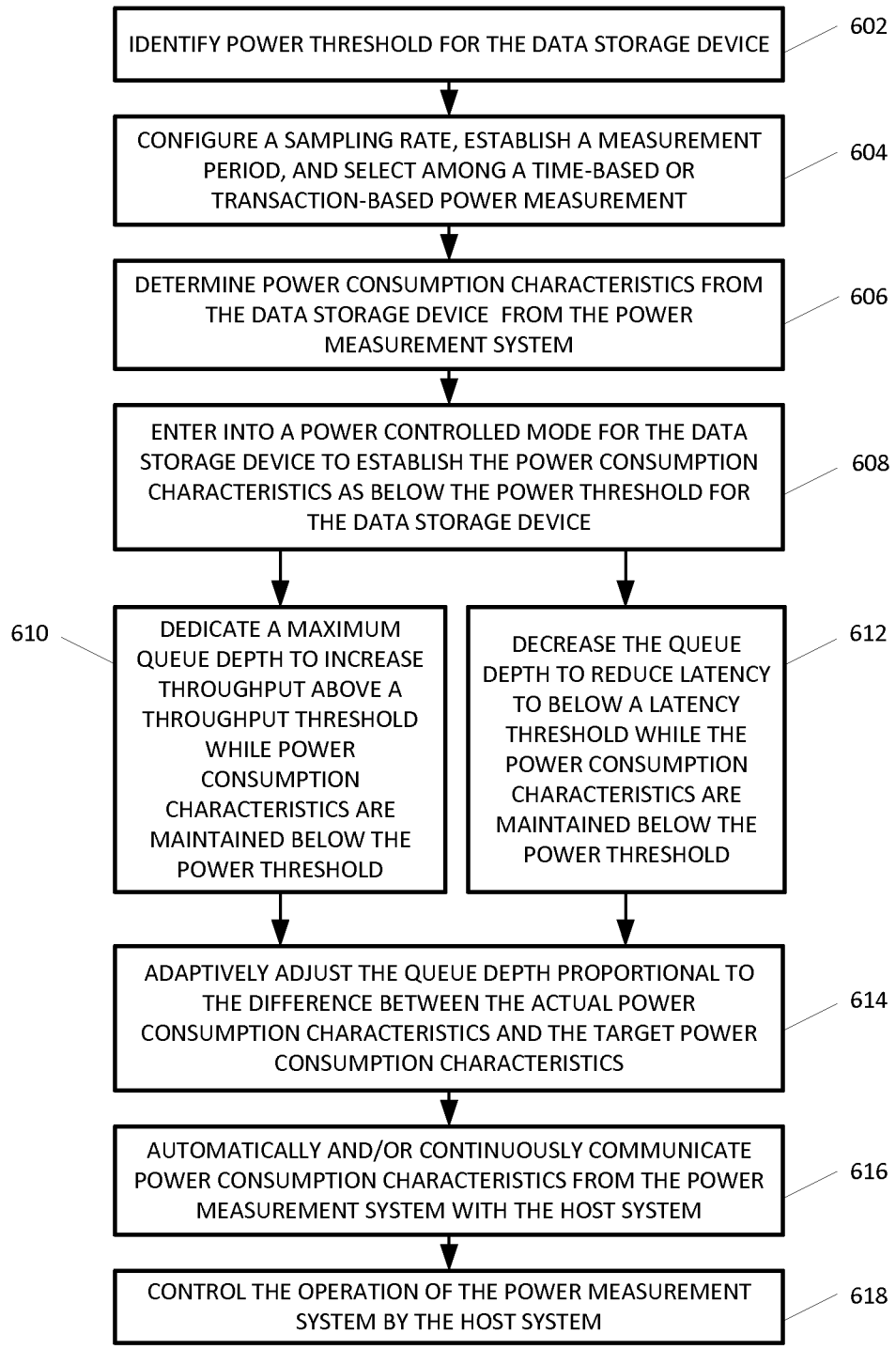
FIG. 6 illustrates a method of operating a storage system for performance-aware power capping in a data storage device.

FIG. 6 illustrates a method of operating storage system 400 for performance-aware power capping in a data storage device. The operations can be performed either by data storage device 402 or by host system 420 independently or by data storage device 402 and host system 420 simultaneously. The operations of FIG. 6 are referenced below parenthetically.

In a first example of FIG. 6, data storage device 402 performs the operations of FIG. 6, although it should be understood that operations in FIG. 6 can be performed in host system 120, as mentioned above. Data storage device 402 identifies power threshold 410 for data storage device 402 (602). Power threshold 410 indicates allowable maximum or minimum power consumption characteristics for data storage device 402. Power threshold 410 specifies power consumption threshold values in Watts or other units of power or energy dissipation. Data storage device 402 configures a sampling rate, establishes a measurement period, and selects among a time-based or transaction-based power measurement to determine power consumption characteristics (604). Power consumption characteristics may be measured various manners. Both data storage device 402 and host system 420 are capable of configuring sampling rates, establishing measurement periods, and selected among a time-based or transaction-based power measurement offering a high-degree of flexibility and control over power measurements. In some examples, data storage device 402 includes power measurement system 418. Data storage device 402 determines power consumption characteristics for data storage device 402 from power measurement system 418 (606). Power consumption characteristics can be defined in various ways. For example, power consumption characteristics may indicate maximum allowable power dissipation per unit or time or per a transaction for data storage device 402. Enter into a power controlled mode for data storage device 402 to establish the power consumption characteristics as below power threshold 410 (608). A power controlled mode is an operating mode for data storage device 402 that provides a fine degree of control over the power consumption characteristics of data storage device 402 by controlling queue depth 440.

Throughput mode and latency mode are two performance-oriented modes a storage device can work in while being power controlled. These modes are discussed herein. In throughput mode storage control system 414 or host system 420 dedicates a maximum queue depth 440 to increase throughput above a throughput threshold while power consumption characteristics are maintained below the power threshold (610). In latency mode storage control system 414 or host system 420 decreases queue depth 440 to reduce latency below a latency threshold, while the power consumption characteristics are maintained below the power threshold (612). Data storage device 402 and host system 420 may alternate between throughput mode and latency mode to achieve the desired power consumption characteristics of data storage device 402. Storage control system 414 or host system 420 adaptively adjust queue depth 440 proportional to the difference between the actual power consumption characteristics and the target power consumption characteristics (614). Communicate power meter settings and feedback between host system 420 and data storage device 402 (616). Data storage system 402 provides host system 420 with power consumption characteristics. Control the operation of power measurement system 418 by host system 420 (618). Power measurement system 418 is configured to accept commands from host system. Size ranges within queue (620) can be set as well instead of a single queue depth.

Figure 7:
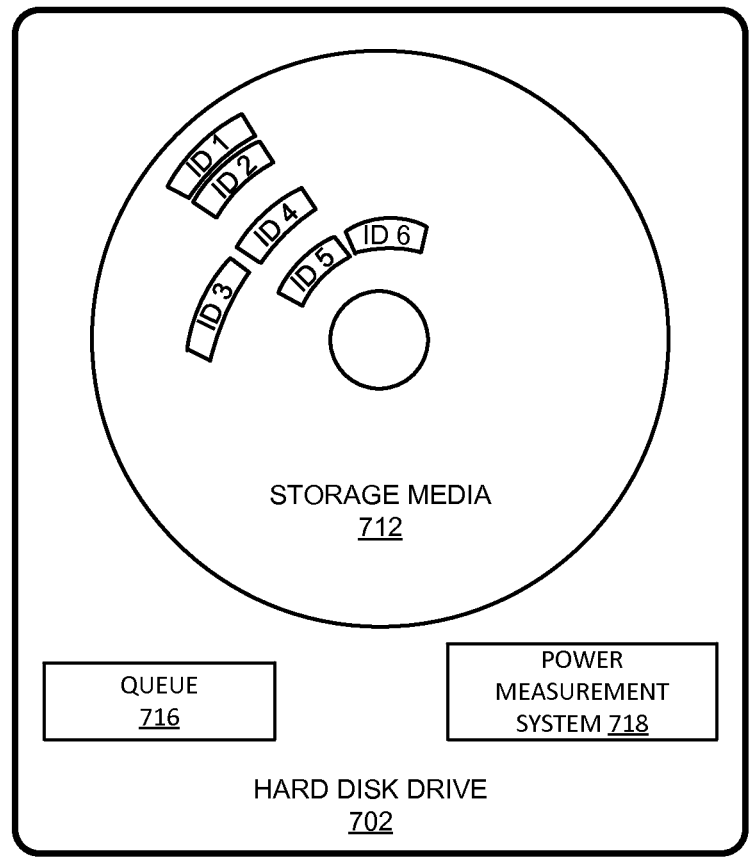
FIG. 7 illustrates a data storage device for performance-aware power capping in a data storage device.

FIG. 7 illustrates hard disk drive 702 for performance-aware power capping in data storage devices. Hard disk drive 702 is an example of data storage device 102 and data storage device 402, although data storage device 102 and data storage device 402 may have alternative configurations and operations. Hard disk drive 702 comprises storage media 712, queue 716 and power measurement system 718. Storage media 712 is illustrated with a series of identifiers ID 1-ID 6. In operation, power consumption characteristics of hard disk drive 702 can be determined by writing a set of identifiers (represented by ID 1-ID 6) to predefined locations on storage media 712 responsive to an asynchronous request from a host system and measuring the associated power consumption.

Figure 8:
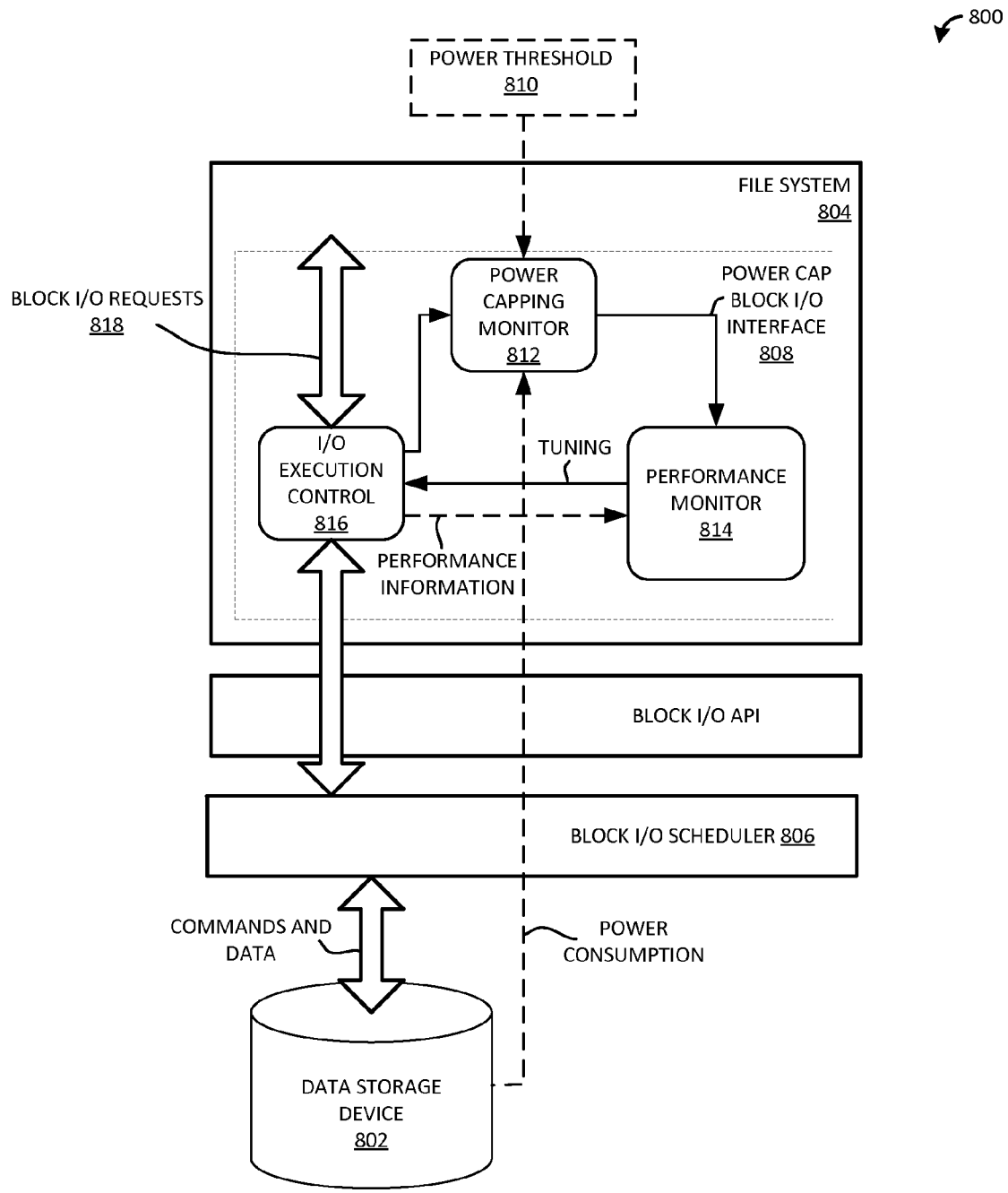
FIG. 8 illustrates architecture for performance-aware power capping in a data storage device.

FIG. 8 illustrates storage system 800 for performance-aware power capping in data storage devices. Storage system 800 is an example of storage system 100 and storage system 400, although storage system 100 and storage system 400 may have alternative configurations and methods of operation. Storage system 800 comprises data storage device 802, file system 804, and block I/O scheduler 806. Data storage device 802 can be a hard disk drive, solid state storage drive, flash memory drive, or some other type of data storage device, including combinations and variations thereof.

File system 802 can be a disk file system, optical disk file system, flash file system, tape file system, a transactional file system, networked file system, shared disk file system, device file systems and other files systems. Disk file system may include FAT (FAT12, FAT16, FAT32), exFAT, NTFS, HFS, HFS+, HPFS, UFS, ext2, ext4, XFS, btrfs, ISO 9660, Files-11, Verita File System, VMFS, ZFS, ReiserFS, UDF or some other file system. Optical disk file system may include ISO 9660, Universal Disk Format (UDF), Mount Rainier or some other optical disk file system. Tape file system may include IBM Linear Tape File System—Single Drive Edition (LTFS-SDE) or some other tape file system. Transactional file system may include Transactional NTFS, Valor, Amino, LFS, Transactional ext3, or some other transactional file system. Some examples of networked file systems may include clients for NFS, AFS, SMD protocols, and file-system-like client for FTP and WEBDAV. Some examples of shared disk file systems include GFS2, GPFS, SFS, CXFS, StorNext or some other shared disk file system. File system 804 comprises power cap block I/O interface module 808.

Power cap block I/O interface 808 comprises power capping monitor 812, performance monitor 814, and I/O execution control 816. Performance monitor 814 communicates with I/O execution control 816 and power capping monitor 812. In operation, power capping monitor 812 identifies power threshold 810 and communicates power threshold 810 to performance monitor 814. Performance monitor 814 selects and performs the power controlled mode for data storage device 802 based upon power threshold 810. Performance monitor 814 sends commands to I/O execution control 816. I/O execution control 816 provides feedback to power capping monitor 812 and performance monitor 814 allowing the ability to fine-tune the system's operation.

I/O execution control 816 controls block I/O requests 818 based upon commands received from performance monitor 814. I/O execution control 816 communicates feedback to performance monitor 814 and power capping monitor 812 to allow fine-tuning of the block I/O requests 812. I/O execution control 816 commands block I/O scheduler 806 to adjust queue depth and optimize block I/O requests. Block I/O scheduler 806 transfers commands and data to data storage device 802. Data storage device 802 provides feedback information to power capping module.

Figure 9:
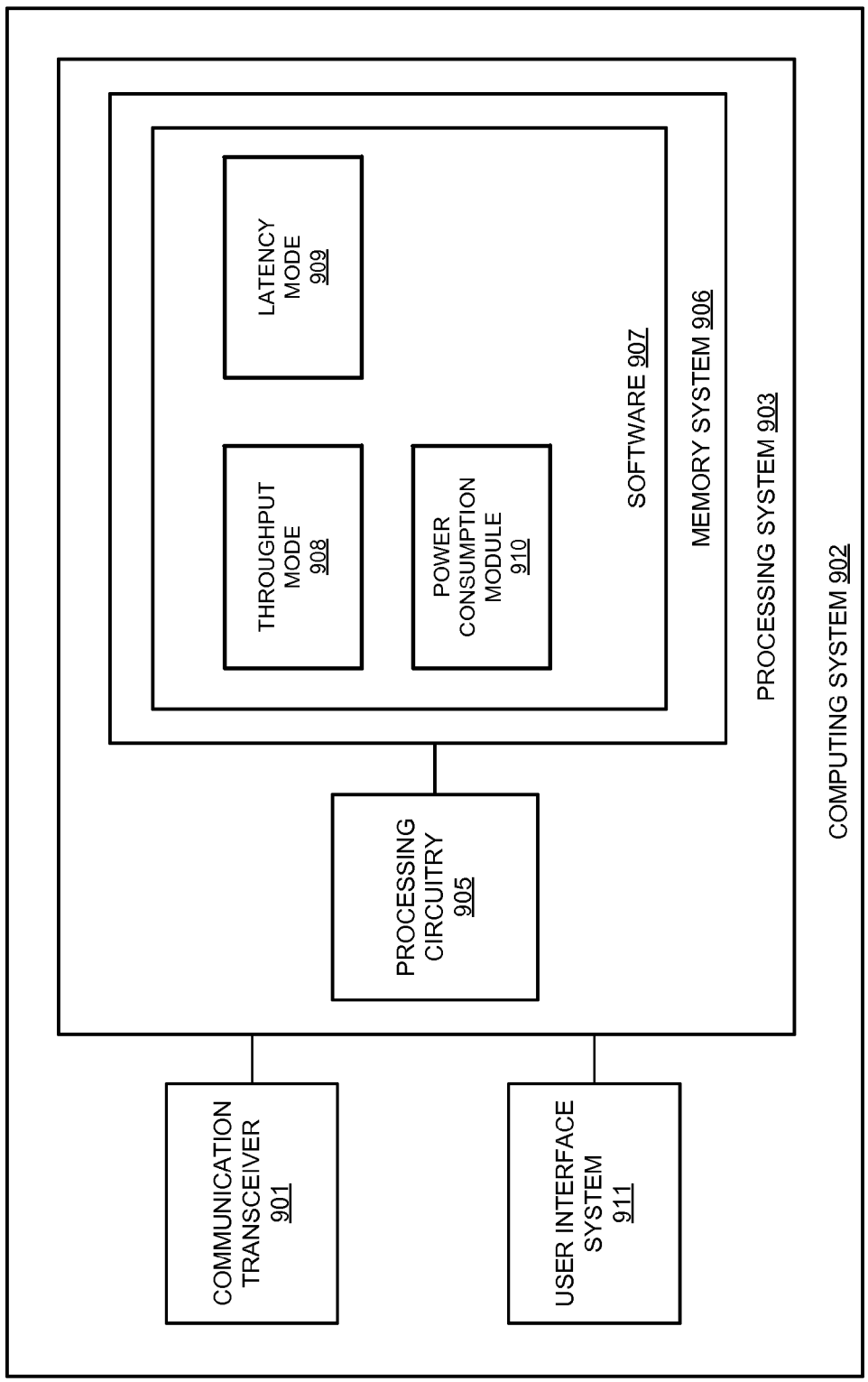
FIG. 9 illustrates a computing system for performance-aware power capping in a data storage device.

FIG. 9 illustrates computing system 902 that is representative of any system or collection of systems in which the various operational architectures, scenarios, and processes disclosed herein may be implemented. Computing system 902 is an example of storage control system 114, host system 120, storage control system 414, and host system 420 are examples of computing system 902, although those examples may have alternative configurations and/or operations. Examples of computing system 902 includes, but is not limited to, smart phones, laptop computers, tablet computers, desktop computers, hybrid computers, gaming machines, virtual machines, smart televisions, and watches and other wearable devices, as well as any variation or combination thereof Other examples include server computers, rack servers, web servers, cloud computer platforms, and data center equipment, as well as any other type of physical or virtual server machine, and any variation or combination thereof.

Computing system 902 may be implemented as a single apparatus, system, or device or may be implemented in a distributed manner as multiple apparatuses, systems, or devices. Computing system 902 comprises communication transceiver 901 and processing system 903. Processing system 903 comprises processor circuitry 905 and memory system 906. Memory system comprises software 907 that includes throughput mode module 908, latency mode module 909, and power consumption module 910.

Processing system 903 loads and executes in processor circuitry 905 software 907 from memory system 906. When executed by processing system 905 for performance-aware power capping of a data storage device, software 907 directs processing circuitry 905 to operate as described herein for at least the various processes, operational scenarios, and sequences discussed in the foregoing implementations with performance-aware power capping of a data storage device. Computing system 902 may optionally include additional devices, features, or functionality not discussed for purposes of brevity.

Processing circuitry 905 may comprise a micro-processor and other circuitry that retrieves and executes software 907 from memory 906. Processing circuitry 905 may be implemented within a single processing device, but may also be distributed across multiple processing devices or sub-systems that cooperate in executing program instructions. Examples of processing circuitry 905 include general purpose central processing units, application specific processors, and logic devices, as well as any other type of processing device, combinations, or variations thereof.

Memory system 906 may comprise any non-transitory computer readable storage media readable by processing system 905 and capable of storing software 907. Memory system 906 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media.

In addition to computer readable storage media, in some implementations memory system 906 may also include computer readable communication media over which software 907 may be communicated internally or externally. Memory system 906 may be implemented as a single storage device, but may also be implemented across multiple storage devices or sub-systems co-located or distributed relative to each other. Memory system 906 may comprise additional elements, such as a controller, capable of communicating with processing system 903 or possibly other systems.

Software 907 may be implemented in program instructions and among other functions may, when executed by processing system 903, direct processing system 903 to operate as described with respect to the various operational scenarios, sequences, and processes illustrated herein. For example, software 907 may include program instructions for implementing a code service and its associated functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof Software 907 may include additional processes, programs, or components, such as operating system software or other application software. Software 907 may also comprise firmware or some other form of machine-readable processing instructions executable by processing system 903.

In general, software 907 may, when loaded into processing system 903 and executed by processing circuitry 905, transform a suitable apparatus, system, or device (of which computer system 902 is representative) overall from a general-purpose computer system into a special-purpose computer system customized to facilitate enhanced component interoperability. Indeed, encoding software 907 on memory system 906 may transform the physical structure of memory system 906. The specific transformation of the physical structure may depend on various factors in different implementations of this description. Examples of such factors may include, but are not limited to, the technology used to implement the storage media of memory system 906 and whether the computer-storage media are characterized as primary or secondary storage, as well as other factors.

For example, if the computer readable storage media are implemented as semiconductor-based memory, software 907 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

In at least one implementation, the program instructions can include throughput mode module 908, latency mode module 909, and power consumption module 910. Throughput mode module 908 includes establishing a queue depth of a storage drive to cap power consumption of the storage drive while maintaining a desired throughput rate. Latency mode module 909 includes establishing a queue depth of the storage drive to cap power consumption of the storage drive while maintaining a desired read/write latency for data stored on the storage drive. Power consumption module 910 measures and monitors power consumption of the storage drive. Power consumption module 910 can receive power measurement data from external systems, such as power monitoring circuitry implemented on the storage drive. The power measurement data can include a digitized representation of a present power draw of the storage drive. Power consumption module 910 can receive the power measurement data over communication transceiver 901. Power consumption module 910 can transfer power measurement data to any of throughput mode module 908, latency mode module 909 for use in determining queue depths that establish either the throughput mode or latency mode of operation of the storage drive.

It may be understood that computing system 902 is generally intended to represent a computing system or systems on which software 907 may be deployed and executed in order to implement enhanced component interoperability. However, computing system 902 may also be suitable as any computing system on which software 907 may be staged and from where one or both may be distributed, transported, downloaded, or otherwise provided to yet another computing system for deployment and execution, or yet additional distribution.

Communication transceiver 901 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 911 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 911. In some cases, the input and output devices may be combined in a single device, such as a display capable of displaying images and receiving touch gestures. The aforementioned user input and output devices are well known in the art and need not be discussed at length here.

User interface system 911 may also include associated user interface software executable by processor circuitry 905 in support of the various user input and output devices discussed above. Separately or in conjunction with each other and other hardware and software elements, the user interface software and user interface devices may support a graphical user interface, a natural user interface, or any other type of user interface.

Communication between computing system 902 and other computing systems (not shown), may occur over a communication network or networks and in accordance with various communication protocols, combinations of protocols, or variations thereof Examples include intranets, internets, the Internet, local area networks, wide area networks, wireless networks, wired networks, virtual networks, software defined networks, data center buses, computing backplanes, or any other type of network, combination of network, or variation thereof The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method for operating a host system to control a data storage device, the method comprising:
   identifying a power threshold for the data storage device;
   determining power consumption for the data storage device;
   selecting an operation mode for the data storage device that maintains the power consumption below the power threshold, wherein the operation mode is selected from a throughput mode and a latency mode;
   operating the data storage device in the selected operation mode;
   alternating operation of the data storage device among the throughput mode and the latency mode to maintain the power consumption below the power threshold; and
   adaptively adjusting a depth of a storage transaction queue of the data storage device proportional to a difference between the power consumption and the power threshold;
   wherein the throughput mode comprises increasing throughput of the data storage device above a throughput threshold while the power consumption is maintained below the power threshold by at least adjusting the depth of the storage transaction queue of the data storage device to provide movement optimization of read/write heads by the data storage device during servicing of the storage transaction queue; and
   wherein the latency mode comprises reducing latency of the data storage device to below a latency threshold while maintaining sufficient depth of the storage transaction queue to establish the power consumption below the power.

2. The method of claim 1 wherein adjusting the depth of the storage transaction queue comprises dedicating a maximum depth of the storage transaction queue to increase the throughput above the throughput threshold while the power consumption is maintained below the power threshold.

3. The method of claim 1 wherein adjusting the depth of the storage transaction queue comprises decreasing the depth of the storage transaction queue to reduce the latency to below the latency threshold while the power consumption is maintained below the power threshold.

4. The method of claim 1 further comprising receiving indications of the power consumption measured by the data storage device utilizing a power measurement system in the data storage device.

5. The method of claim 1 further comprising receiving indications of the power consumption from the data storage device, wherein the power consumption is related to movement of the read/write heads across associated storage media.

6. The method of claim 1 wherein the power consumption is determined by at least one of configuring a sampling rate, establishing a measurement period, and selecting among a time-based power measurement and a transaction-based power measurement for a power measurement system of the data storage device.

7. The method of claim 1 wherein the data storage device is configured to receive and respond to control commands from the host system to control operation of at least a power measurement system of the data storage device to measure the power consumption of the data storage device.

8. The method of claim 1 further comprising issuing asynchronous requests to the data storage device that write a set of identifiers to predefined locations on storage media of the data storage device and are employed to measure associated power consumption related to corresponding movement of the read/write heads across the storage media.

9. The method of claim 1 further comprising identifying a range of queue depth sizes within the storage transaction queue.

10. A system for controlling power consumption in a data storage device, the system comprising:
    power measurement circuitry configured to monitor power consumption related to movement of read/write heads across storage media of the data storage device; and
    a storage control system including processing circuitry configured to:
      identify a power threshold of the data storage device;
      alternate selection of an operational mode for the data storage device based on maintaining the power consumption below the power threshold, wherein the operational mode is selected from the group consisting of a throughput mode or a latency mode;
      control operation of the data storage device based on the alternating operational mode; and
      adaptively adjust a depth of a storage transaction queue of the data storage device proportional to a difference between the power consumption and the power threshold;
    wherein the throughput mode comprises increasing throughput of the data storage device above a throughput threshold while the power consumption is maintained below the power threshold by at least adjusting the depth of the storage transaction queue of the data storage device to provide movement optimization of the read/write heads by the data storage device during servicing of the storage transaction queue; and
    wherein the latency mode comprises reducing latency of the data storage device to below a latency threshold by at least adjusting the depth of the storage transaction queue while maintaining sufficient depth of the storage transaction queue to establish the power consumption below the power threshold.

11. The system of claim 10 wherein, to adjust the depth of the storage transaction queue, the storage control system is configured to dedicate a maximum depth of the storage transaction queue to increase the throughput above the throughput threshold while the power consumption is maintained below the power threshold.

12. The system of claim 10 wherein, to adjust the depth of the storage transaction queue, the storage control system is configured to decrease the depth of the storage transaction queue to reduce the latency to below the latency threshold while the power consumption is maintained below the power threshold.

13. The system of claim 10 wherein the data storage device measures the power consumption of the data storage device.

14. The system of claim 13 wherein the power measurement system is further configured to receive indications of the power consumption from the data storage device, wherein the power consumption is related to movement of the read/write heads across associated storage media.

15. The system of claim 13 wherein the power consumption is determined with at least one of a configurable sampling rate, a configurable measurement period, a time-based power measurement, and a transaction-based power measurement.

16. The system of claim 13 wherein the data storage device is configured to receive and respond to control commands from the host system to control operation of at least a power measuring system of the data storage device to measure the power consumption of the data storage device.

17. The system of claim 10 wherein the storage control system is further configured to issue asynchronous requests to the data storage device that write a set of identifiers to predefined locations on storage media of the data storage device and are employed to measure associated power consumption related to corresponding movement of the read/write heads across the storage media.

18. The system of claim 10 wherein the storage control system is further configured to identify a range of queue depth sizes within the storage transaction queue.

19. A power consumption control system comprising:
means for monitoring power consumption of a data storage device related to movement of read/write heads across storage media of the data storage device; and
means for controlling operation of the data storage device including:
identifying a power threshold of the data storage device;
alternating selection of an operational mode for the data storage device between a throughput operational mode and a latency operational mode;
controlling operation of the data storage device based on the alternating selection of the operational mode to maintain the power consumption below the power threshold; and
adaptively adjusting a depth of a storage transaction queue of the data storage device proportional to a difference between the power consumption and the power threshold;
wherein the throughput mode comprises increasing throughput of the data storage device above a throughput threshold by at least adjusting the depth of the storage transaction queue of the data storage device to provide movement optimization of the read/write heads by the data storage device during servicing of the storage transaction queue; and
wherein the latency mode comprises reducing latency of the data storage device to below a latency threshold by at least adjusting the depth of the storage transaction queue while maintaining sufficient depth of the storage transaction queue to establish the power consumption below the power threshold.

* * * * *